No. 640,673. Patented Jan. 2, 1900.
G. W. LEWIS.
GAS ENGINE.
(Application filed Nov. 8, 1894. Renewed Sept. 22, 1898.)
(No Model.) 6 Sheets—Sheet 2.
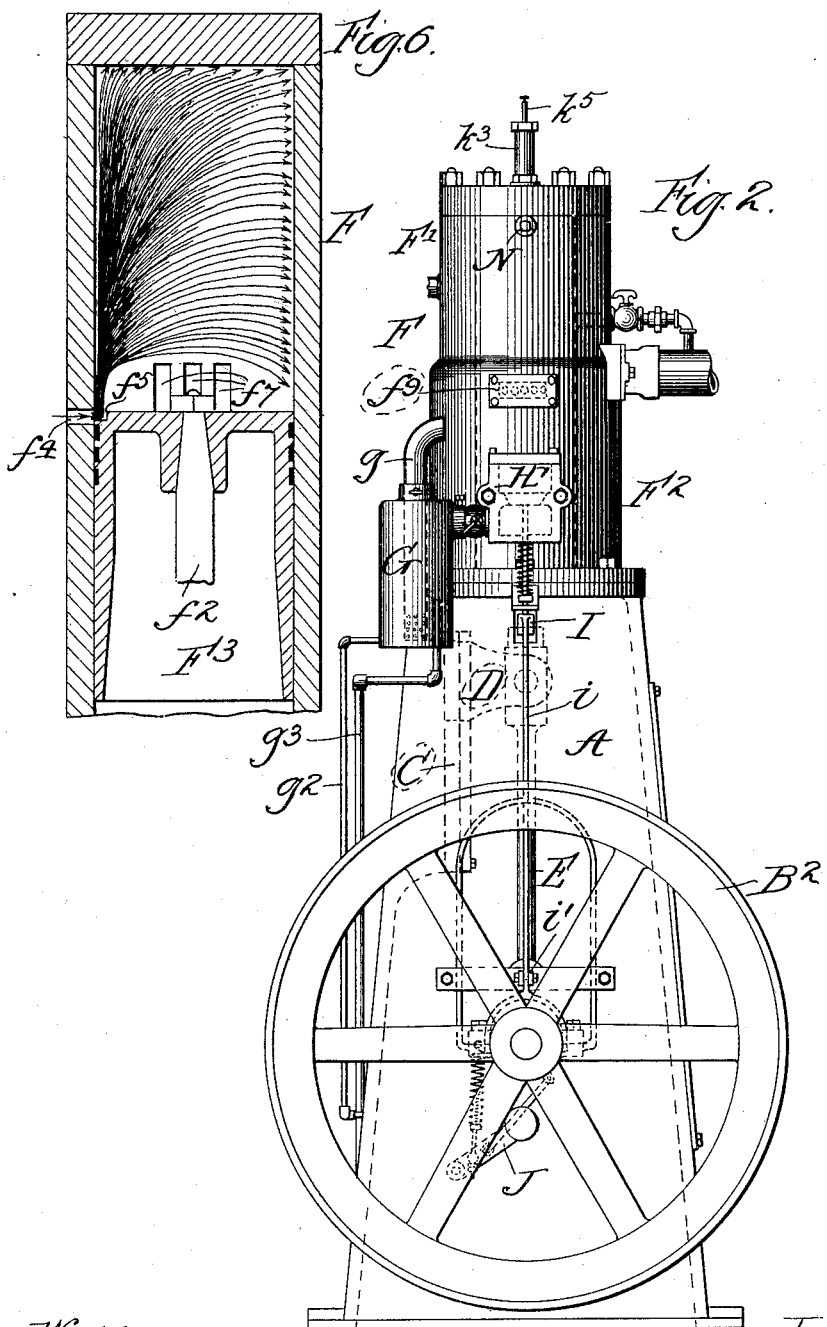
Witnesses.
Inventor
George W. Lewis.

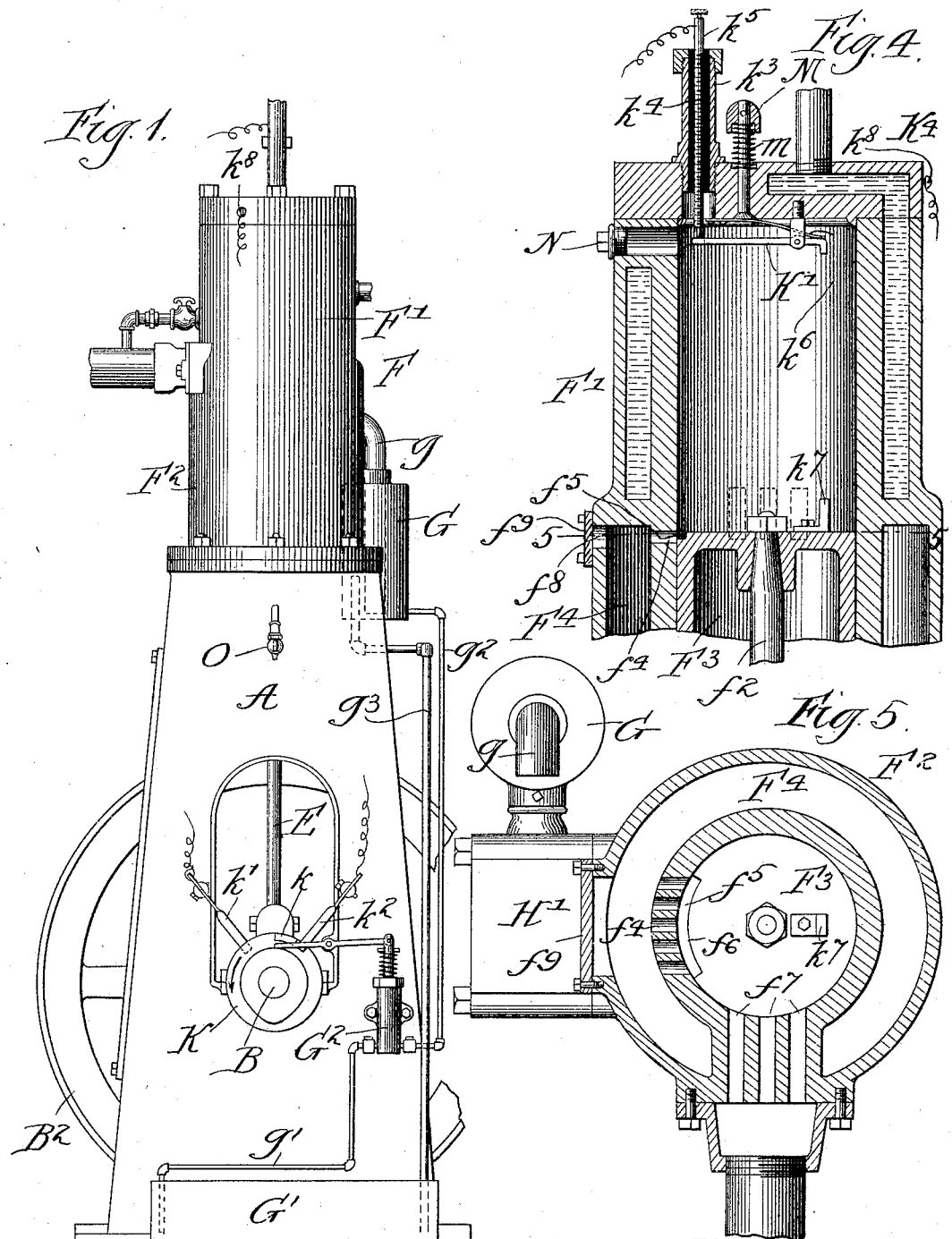

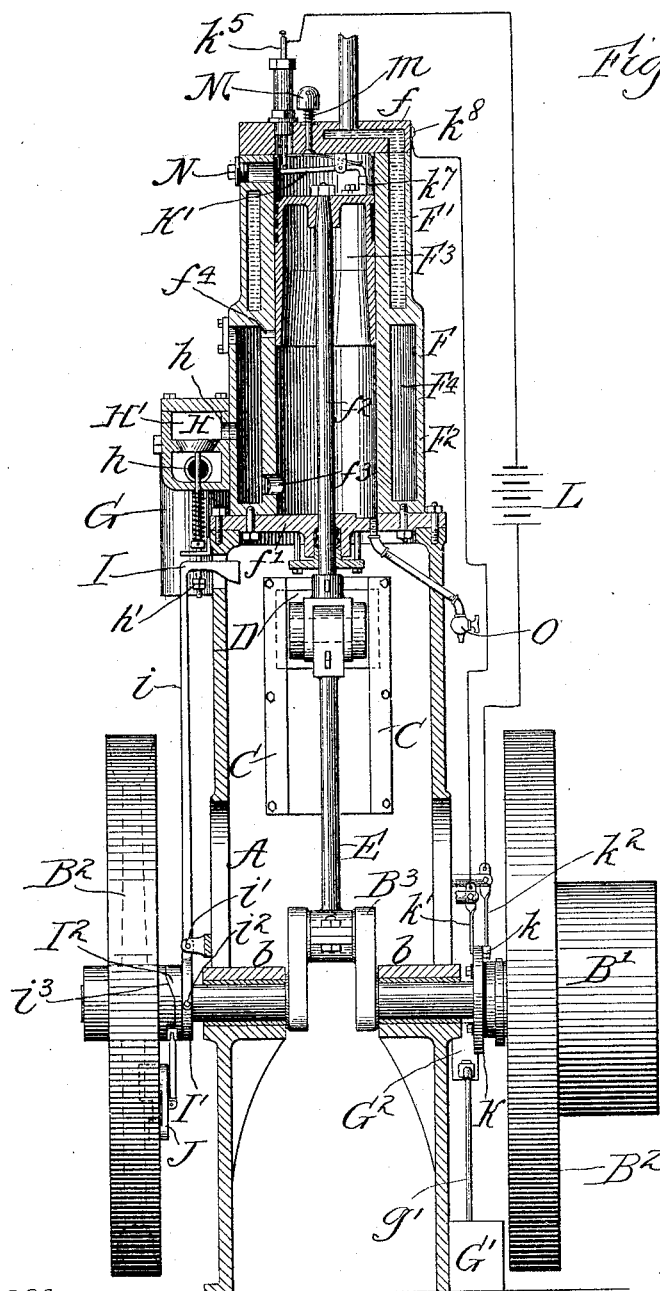

No. 640,673. Patented Jan. 2, 1900.
G. W. LEWIS.
GAS ENGINE.
(Application filed Nov. 8, 1894. Renewed Sept. 22, 1898.)
(No Model.) 6 Sheets—Sheet 4.
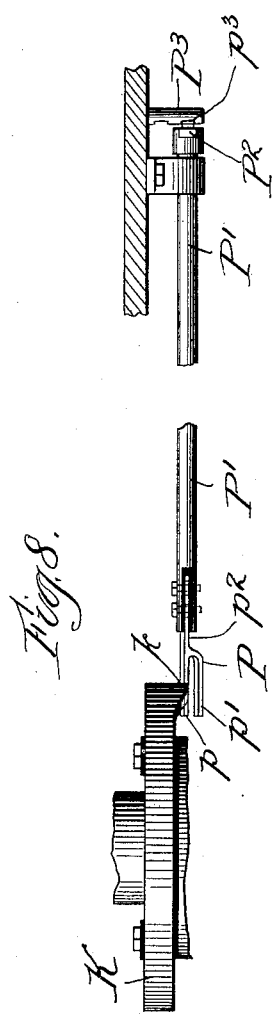
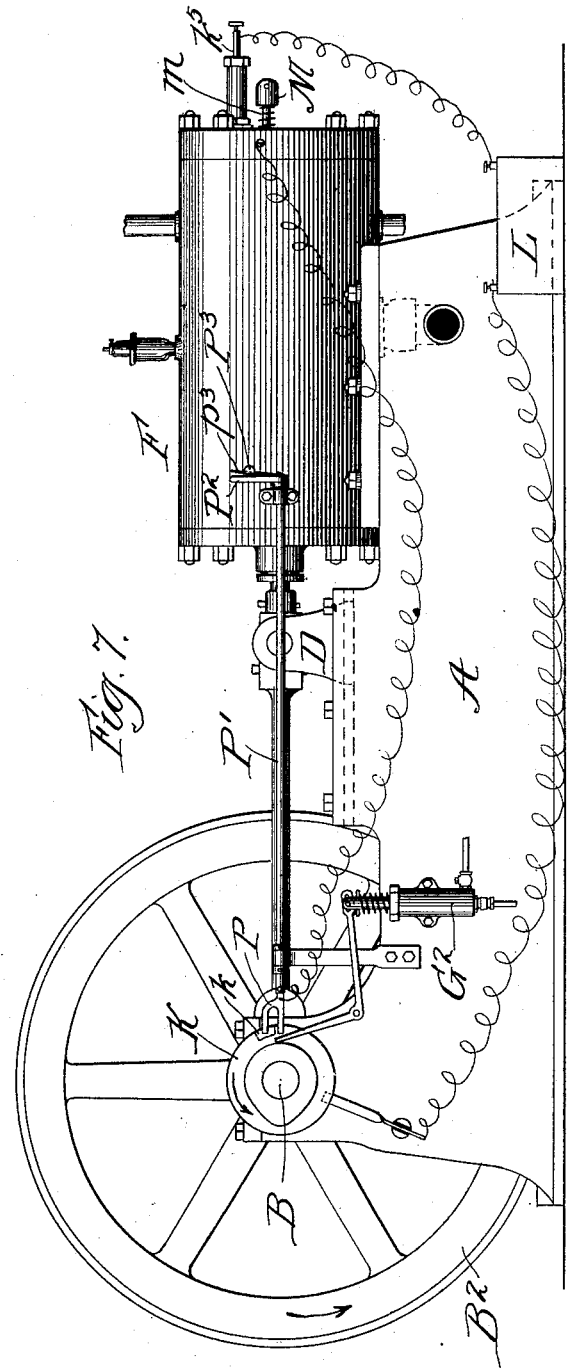
Witnesses.
Inventor
George W. Lewis.
by Dayton, Poole & Brown,
Atty's.

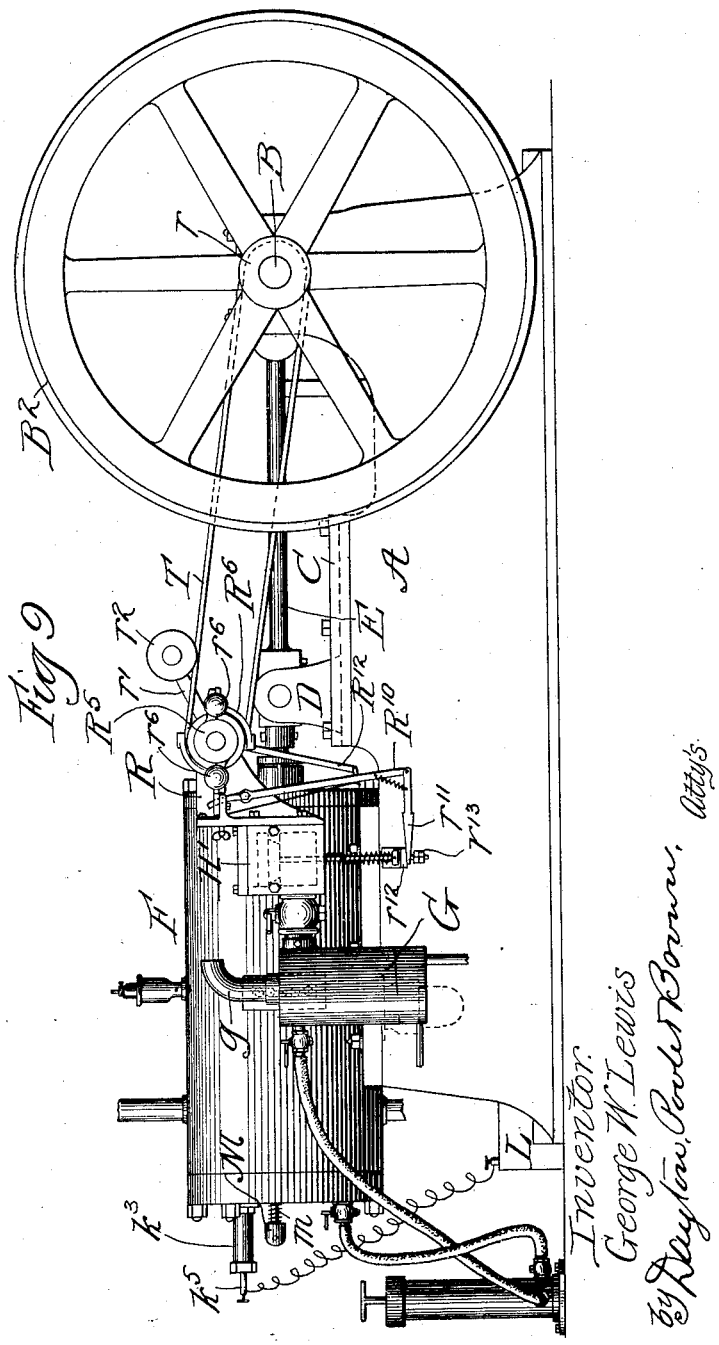

No. 640,673. Patented Jan. 2, 1900.
G. W. LEWIS.
GAS ENGINE.
(Application filed Nov. 8, 1894. Renewed Sept. 22, 1898.)
(No Model.) 6 Sheets—Sheet 6.
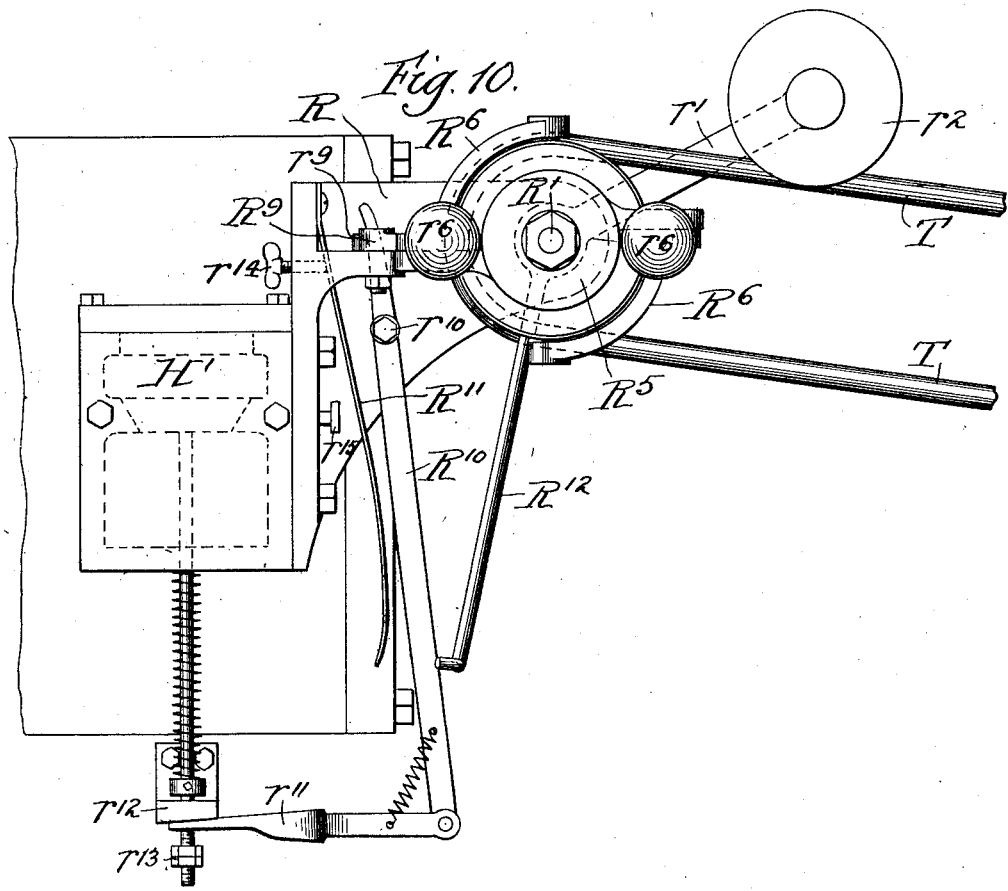
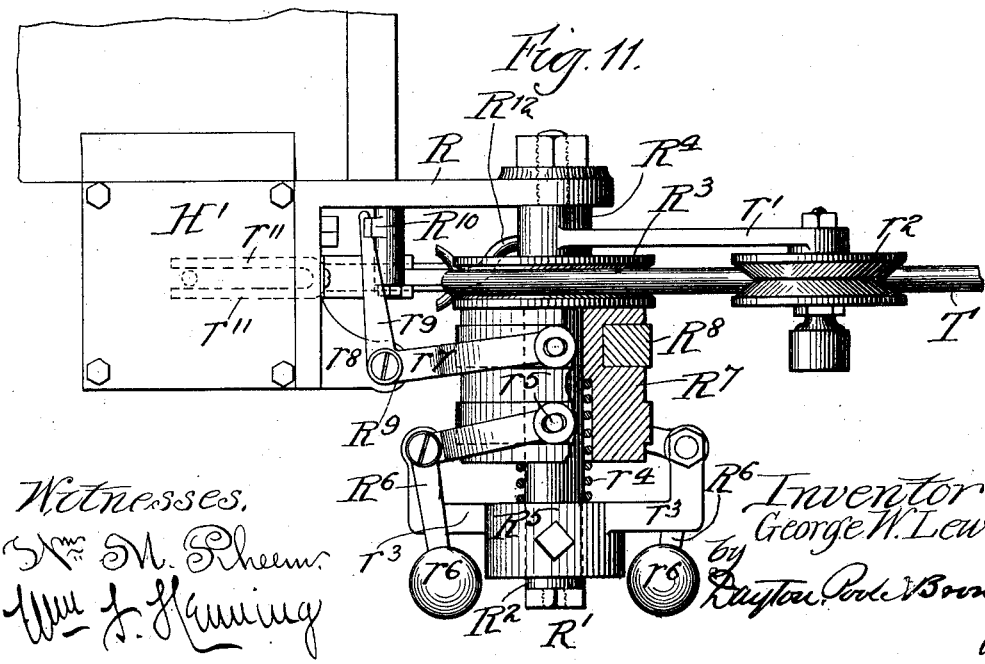
Witnesses.
Inventor
George W. Lewis.
Att'ys

UNITED STATES PATENT OFFICE.

GEORGE W. LEWIS, OF CHICAGO, ILLINOIS, ASSIGNOR TO THE J. THOMPSON & SONS MANUFACTURING COMPANY, OF BELOIT, WISCONSIN.

GAS-ENGINE.

SPECIFICATION forming part of Letters Patent No. 640,673, dated January 2, 1900.

Application filed November 8, 1894. Renewed September 22, 1898. Serial No. 691,629. (No model.)

*To all whom it may concern:*

Be it known that I, GEORGE W. LEWIS, of Chicago, in the county of Cook and State of Illinois, have invented certain new and useful Improvements in Gas-Engines; and I do hereby declare that the following is a full, clear, and exact description thereof, reference being had to the accompanying drawings, and to the letters of reference marked thereon, which form a part of this specification.

This invention relates to improvements in gas or vapor engines, and refers more particularly to improvements in governing mechanism for gas-engines.

The object of the invention is to secure a more reliable control of the supply-valve and to secure the stoppage of the engine in case the governor-driving belt should break.

In the drawings I have shown both vertical and horizontal gas-engines, each containing some of the improvements referred to.

Figures 1 and 2 are side elevations showing opposite sides of a vertical engine. Fig. 3 is vertical section of the vertical engine in the axis of the bearings of the crank-shaft, said crank-shaft and the fly-wheels and pulley thereon being shown in elevation. Fig. 4 is an enlarged axial section of the power end of the cylinder in the same plane as the same parts are shown in Fig. 3. Fig. 5 is a horizontal section in the plane of line 5 5 of Fig. 4. Fig. 6 is a longitudinal section of the power-cylinder, showing by a series of arrows the direction taken by the inflammable mixture when admitted to said upper cylinder. Figs. 7 and 9 are side elevations of a horizontal engine containing my improvements, said figures showing opposite sides of the engine. Fig. 8 is an enlarged view of the cam seen in side elevation in Fig. 7 and circuit-closer engaged by said cam. Fig. 10 is a side elevation, enlarged, of the governor shown on a small scale in Fig. 7; and Fig. 11 is a top view, in partial section, of said governor devices.

In the following description it will be understood that the combined power and pumping cylinder (shown in its details in connection with the vertical arrangement of the engine) is the same as that of the horizontal engine.

First describing the engine in connection with the figures showing the vertical form thereof, A represents the frame supporting the various parts. B is a centrally-cranked power-shaft, mounted in bearings $b$ of said frame and carrying the driving-pulley B' and fly-wheels $B^2$ $B^2$.

C C are guides for a cross-head D, said guides being secured to the frame, as shown in dotted lines in Fig. 2 and in full lines in Fig. 3, or otherwise, as may be preferred.

E is the pitman connecting the cross-head D with the crank $B^3$ on the shaft B.

F is the cylinder, of which F' is the power end and $F^2$ the pump end. Said cylinder F is closed by heads $f$ $f'$ at both ends, the head $f'$, closing the pump end of the cylinder, being provided with a stuffing-box, through which works the piston-rod $f^2$, connected, respectively, to the cross-head D and to the piston or plunger $F^3$.

G is a carbureter, which in some form will be employed when the engine is intended to use the vapor of a liquid hydrocarbon with air as the explosive mixture, $g$ being the inlet air-pipe, having a straight portion which passes through the upper head of the chamber for the liquid hydrocarbon and its lower end perforated at its sides, as indicated by dotted lines in Fig. 2. The said air-pipe $g$ is shown as being vertically adjustable within the carbureting-chamber.

G', Figs. 1 and 3, is a supply-tank, $G^2$ being a pump operated allowably by a peripheral cam on the main shaft B, as indicated in Fig. 1, and connected with the supply-tank G' by a pipe $g'$ and with the carbureter by a pipe $g^2$. An overflow-pipe leading from the carbureter back to the supply-tank is shown as $g^3$, said overflow-pipe being indicated as having its open end within the carbureter at a suitable distance above the bottom of the latter to give the desired or predetermined level to liquid within said carbureter.

H is a valve for admitting the explosive mixture into the cylinder, said valve, as herein shown, opening directly from the carbureter into a valve chamber or chest H', which communicates with the cylinder. When other gas than hydrocarbon vapor is used, this valve H will similarly admit the mixture of gas which is delivered to it in any suitable manner.

The cylinder F is connected with a chamber $F^4$, which, as a special improvement, is shown as being external to and concentric with the cylinder proper or, as preferred, external to its lower portion only, said chamber $F^4$ being in communication with the lower end of the interior of the cylinder proper by one or more wide passages $f^3$ and also in communication with the valve-chamber $H'$ through one or more passages $h$. The chamber $F^4$ is also in communication with the power end $F'$ of the cylinder F when the piston $F^3$ is at or near the extreme end of its power throw, which in the illustration of the invention now being described is the downstroke of the vertical engine. The piston $F^3$ is shown as being in trunk form, being hollow in order that the communicating spaces, consisting of the space directly below the piston and the outer space $F^4$, may be as large as possible in proportion to the space behind the piston after the power-stroke has been completed within the least practicable limits, the relative proportions of these spaces in the engine shown being about four to one. In other words, the space within the cylinder and below the piston when the latter is elevated or at the end of its compression-stroke plus the space $F^4$ is about four times the contents of the space behind the piston when the latter has completed its down or power stroke.

Several advantages are gained by the construction in which the chamber $F^4$ is made of annular form and surrounds the cylinder and reaches from the port $f^3$ to the port $f^4$, a principal one being that in this construction immediate communication is afforded between the said chamber and the power end of the cylinder by the port $f^3$ extending through the thickness of the cylinder-wall only, so that the compressed air may expand directly from the chamber into the cylinder. The entrance of air is thus made much more prompt and the speed of the engine correspondingly more rapid than in a construction in which the air-chamber is located at a distance from the power-cylinder, so that the air must be forced through a long passage in passing from the air-chamber to the said cylinder.

The piston $F^3$ covers the passages $f^4$ except when said piston is at and near the end of its power-stroke, as fully indicated by Figs. 3, 4, and 6. The piston is provided with a recess $f^5$, as best seen in Figs. 4, 5, and 6, which recess is arranged to come opposite the inlet-ports $f^4$ when the piston is at the end of its power-stroke, as also indicated in Figs. 4 and 6, said recess having its rear wall $f^6$ abrupt, so as to deflect the incoming mixture of gas and air toward the power-head of the cylinder, as indicated in Fig. 6. The exhaust-ports $f^7$ of the cylinder are arranged at right angles to the inlet-ports $f^4$, as plainly shown in Figs. 4, 5, and 6, instead of opposite said inlet-ports, as heretofore. By this means the escape of the explosive mixture admitted by the inlet-ports is prevented, said mixture being forced toward the adjacent head of the cylinder and gradually filling the power end of the cylinder from that end toward the piston in the gradual opening of the said inlet-ports, as indicated in Fig. 6, forcing the dead gases out through the exhaust-ports $f^7$ without material escape of the live mixture, special economy in this particular being attained by the right-angular arrangement of the inlet and exhaust ports shown and described.

In the integral cast construction shown I have provided an opening $f^8$ through the outer wall of the external chamber $F^4$, which is ordinarily closed with a cap $f^9$, as shown in Figs. 2 and 5, said opening serving in the original construction to permit drilling of the ports $f^4$ and the removal of the cap $f^9$ giving access to the said ports $f^4$ for the purpose of inspecting and clearing them, if necessary.

$G^3$ represents a stop-cock in the pipe for the supply of gas or mixture to the lower compartment of the valve-chest $H'$, which stop-cock may obviously be more or less remote from the engine, according to the particular arrangement of the source of supply of the mixture.

It will be observed that in the construction above set forth but a single valve is employed in the entire engine—to wit, the supply-valve H—and it will also be observed that this valve is remote from the heated power-cylinder and is isolated from the parts connected with the power-cylinder by the interposed chamber $F^4$, to which the cool mixture is supplied on its way to the power end of the cylinder.

The construction of the cylinder and arrangement of the inlet and exhaust ports are not herein made the subject of claims, but such construction is set forth and claimed in an application filed on the 21st day of June, 1899, Serial No. 721,376, and which is a division of this application.

The supply-valve H is operable at each rotation of the crank-shaft B and may be controlled as to the length of its opening stroke, and therefore as to the amount of mixture supplied through the same, by any suitable form of controlling mechanism. The valve is opened by "suction" or, in other words, upon the back stroke of the piston $F^3$, in which stroke the explosive mixture passes from the outer chamber $F^4$ through the port $f^3$ into the space directly below the piston and from the carbureter or other source of supply through the valve H into the said outer chamber $F^4$, the said valve H being of course lifted off its seat in this operation by the superior atmospheric pressure beneath it. In the construction shown in the drawings illustrating the vertical form of the invention the extent of the opening movement on the part of the valve H is shown to be controlled by a centrifugal governor acting upon a wedge-shaped gage I, connected with an arm $i$. Said arm $i$ is pivoted at $i'$, near its lower end, and at its lower extremity is bifurcated and pivoted at $i^2$ to a collar $I'$ on the main shaft. Between this collar I' and the hub of the fly-wheel B² is inserted a second collar I², having one of its edges inclined, as shown at $i^3$, in conformity with the contiguous end of the wheel-hub, and with this interposed, beveled, or inclined edged collar I² is connected the lever J of a familiar form of centrifugal governor. (Seen in Figs. 2 and 3.) The stem $h$ of the valve II extends through the wall of the valve-chest and below the gage I is provided with the usual adjustable nut $h'$, that strikes the lower edge of said gage when the valve is lifted. The farther outward the gage I is thrown the less the distance, therefore, to which the valve H will be lifted, and as the greater outward throw of said gage will result from the higher speed of the engine (through the operation of the centrifugal governor) the higher the speed of the engine the less the opening of the supply-valve H and the less of the explosive mixture will be supplied to the engine. No novelty is claimed in the essential features of this mechanism above described for controlling the degree of opening on the part of the valve H, although I now show an improved form of the wedge, which may be employed with advantage instead of the usual form, if desired. Such improved form of the wedge is adapted for use in connection with other forms of means for regulating its movements, as will be seen from the description hereinafter given of the construction shown in the figures illustrating the horizontal form of the engine, in connection with which its special operation will be fully set forth.

The electric mechanism for producing the spark in the power end of the cylinder is shown in Figs. 1, 3, and 4. Of this mechanism K is a disk fixed on the crank-shaft B, which disk has a short laterally-projecting "contact" or cam $k$ upon one of its sides. $k'\,k^2$ are electrodes, of which the former bears continuously against the even-surfaced side of the disk K, and the latter, or $k^2$, is in position to be struck by the projection $k$ on the opposite side of said disk at each revolution of the crank-shaft. Projecting through a mass of insulating material $k^3$, contained within a tube $k^4$, which is inserted into the head which closes the power end of the cylinder F, is an electrode $k^5$, said electrode protruding into the interior of the cylinder, as indicated clearly in Figs. 3 and 4. K' is a lever within the power end of the cylinder, said lever being pivoted between its ends and adapted to vibrate toward and from the adjacent head of the cylinder, the longer arm being arranged to strike the inner end of the electrode $k^5$ and being normally held in contact with said electrode by means of the spring $k^6$. The piston is provided with a stud $k^7$, arranged in position to strike against the short arm of the lever K' as the piston approaches the end of its compression-stroke. The electrode $k'$ is connected with the upper end of the cylinder—as, for example, shown at $k^8$ in Figs. 1, 3, and 4—and the electrode $k^2$ is connected with the outer end of the electrode $k^5$, as indicated in Fig. 3. In the circuit is shown a battery L or other source of supply of electricity.

The arrangement of the contact $k$ on the disk K with reference to the stroke of the piston F³ is shown to be and desirably is such that the circuit is closed at the time the stud $k^7$ on the piston strikes the lever K', whereupon the circuit is opened between the long arm of the lever and the electrode $k^5$ to produce a spark at such break in the circuit just before the piston has completed its compression-stroke. The contact $k$ is circumferentially short and leaves the electrode $k^2$ before the lever K' again strikes the electrode $k^5$, so that for a brief time the circuit is broken at two points, and the closure of the circuit by resumed contact of the lever K' with the electrode $k^5$ is not followed by the production of a spark between the contact projection $k$ and the electrode $k^2$ by reason of the distance attained between these two contacting elements when the circuit shall have been closed within the cylinder.

When it is desired to start the engine, "gas" may be pumped into the power end of the cylinder either by the pumping device shown in Fig. 7 and in the prior application for patent, Serial No. 520,590, filed by me August 15, 1894, or by rotation by hand of the main crank-shaft of the engine when the size of the engine is so small as to permit. For use in connection with the larger sizes of engines I have provided an additional improvement, which will be described in connection with the figures showing the engine in horizontal form, which will be the usual form of such larger sizes.

M represents a pin which passes freely through the head $f$ of the cylinder and is provided at its inner end with an enlargement fitted to a countersink in the inner surface of said head $f$ and serving as a valve to close the space around the freely-movable pin, the valve being normally held to its seat by means of a spring $m$, arranged external to the cylinder-head $f$ about the pin and between the cylinder-head and a knob on the outer end of the pin. This pin M is adapted to be pushed inward against the long arm of the lever K', so that the operator may by this means break the circuit and produce a spark by hand. This device will be employed mainly in connection with engines of the larger sizes, which will usually be provided with the charging-pump.

N represents a plug fitted to an opening arranged opposite the sparking devices in the power end of the cylinder F, by which from time to time these parts may be inspected without removal of the cylinder-head.

O is a valved oil-drip pipe leading from the lower end of the cylinder F.

Next describing Figs. 7, 8, and 9, which illustrate the improvements in the sparking mechanism and in the governor in connection with the horizontal form of the engine, it will be understood that the construction of the cylinder and generally of the hidden parts in Figs. 7 and 9 correspond with the same parts in the previously-described figures. In Figs. 7 and 8 is especially shown the improvement in the electric-sparking circuit. K shows the same disk on the crank-shaft as in the previously-described figures, and $k$ the short circuit-closing projection on said disk. In this improvement I have shown a movable electrode for giving a closed circuit when the crank-shaft is brought to a position past the dead-center by hand to enable the engine to be started by an explosion produced by breaking the circuit within the cylinder by hand and by inward thrust of the pin M, already described. In the preferred form of the movable electrode shown P represents a bifurcated piece for contact with the projection $k$, said bifurcated or forked electrode having two arms $p\ p'$ and being adapted to oscillate as a whole in the axis of the arm or fork $p$. P' is the rod into which a shank $p^2$ of the electrode P, arranged in a line with the fork $p$, is insulated, as most plainly shown in Fig. 8, said rod P' being mounted in fixed bearings within which it may rock and being provided with a laterally-projecting lever arm or handle $P^2$ at its end remote from the fork. $P^3$ is a fixed stud containing two notches, into either of which a latch-spring $p^3$, attached to the lever-arm $P^2$, may catch to hold the oscillating rod P' in either one of the positions to which it may be rocked. The axial fork $p$ of the electrode P corresponds with the electrode $k^2$ in the construction shown in the preceding figures. The object of the second and offset fork $p$ is to effect the closure of the sparking-circuit when the crank-shaft is off the dead-center in the direction it is to revolve, so that in a heavy engine a movement of the fly-wheel by hand to bring the crank-shaft thus a little beyond the dead-center may enable the engine to be started or initially put in motion by a spark-produced explosion. Preparatory to this explosion the electrode is rotated into the position shown in Fig. 7 and desirably locked by the catch $p^3$ or other suitable device, the fly-wheel is turned forwardly to bring the projection $k$ into contact with the offset fork $p'$, and with the parts in these positions explosive mixture is pumped into the cylinder by means of the devices illustrated in Fig. 9 or otherwise, after which the pin M is pushed inwardly by hand to break the circuit at the electrode $k^5$ within the cylinder and there produce the spark required. The crank-shaft being off and past the dead-center, as stated, the explosion which results from the spark thus produced sets the engine in motion. As soon as the engine has been put in motion the forked electrode P is rotated to bring the offset fork $p'$ out of the path of the projection $k$, leaving the fork $p$ only in the path of said projection, and thereafter the action is that described in connection with the preceding figures of the drawings. The last-mentioned position of the electrode is clearly illustrated in Fig. 8.

The sparking mechanism above described is not herein made the subject of claims; but such mechanism is set forth and claimed in an application filed by me on the 21st day of June, 1899, Serial No. 721,375, and which is a division of this application.

In Figs. 9, 10, and 11 are shown my improvements in governing devices. In the form in which these are here illustrated R is a bracket secured to the valve-chest H', from which bracket projects a pin or spindle R', that stands parallel with the crank-shaft. On the pin R' is mounted a sleeve $R^2$, that carries near its inner end a pulley $R^3$, over which is trained a cord or belt T, which also passes over a similar pulley on the crank-shaft, as seen in Fig. 9. Between the pulley $R^3$ and the bracket R is mounted loosely on the pin R' a sleeve $R^4$, having a laterally-projecting arm $r'$, that carries at its outer extremity a suitably heavy pulley $r^2$, arranged to ride on the belt T. At the outer end of the sleeve $R^2$ is secured a collar $R^5$, having arms $r^3$, which are directed inwardly toward the pulley $R^3$ and at their inner extremities have pivoted to them the bell-cranks $R^6$. Upon the sleeve $R^2$ is arranged a sliding sleeve $R^7$, which is normally pressed inwardly against or toward the pulley $R^3$ by an expanding spring $r^4$, which bears at its outer end against the collar $R^5$ and at its inner end against the sleeve $R^7$, or against an interior shoulder thereof, as illustrated in Fig. 11. The inner arms of the bell-cranks $R^6$ are curved to opposite sides of the sleeve $R^7$, as shown in Fig. 10, with which sleeve they connect appropriately by pins $r^5$, and the outer arms of said bell-cranks carry the governor-weights $r^6$. $R^8$ is a collar set loosely in a circumferential groove in the sleeve $R^7$, and with said collar are engaged the forked ends of the arm $r^7$ of a bell-crank $R^9$, which is pivoted at its angle on a vertical pivot to a lug $r^8$ upon the bracket R, the remaining arm $r^9$ of said bell-crank $R^9$ projecting horizontally inward back of the pulley $R^3$. $R^{10}$, Fig. 10, is a nearly-vertical lever pivoted at $r^{10}$ to the bracket on an axis parallel with the spindle R' and carrying at its lower end a forked wedge $r^{11}$ or other suitable form of movable gage for limiting the opening movements of the supply-valve. In this instance the gage-wedge projects between the fixed guide $r^{12}$, through which the stem of the supply-valve of the engine projects downwardly, and the nut $r^{13}$ adjustably fixed on the lower extremity of said valve-stem. Above the pivot $r^{10}$ the bar $R^{10}$ projects into suitable engagement with the bell-crank arm $r^9$, as, for example, indicated in Fig. 11. $R^{11}$ is a spring having its upper end fixed to the bracket R and its lower end arranged to press outwardly against the bar $R^{10}$ in such manner as to tend to retract the forked wedge $r^{11}$ between the guide $r^{12}$ and the nut $r^{13}$. Said spring $R^{11}$ is adapted to be adjusted in its outward pressure upon the bar $R^{10}$—as, for example, by means of an adjusting-screw $r^{14}$—and its adjusted strength should be such as to fully resist the centrifugal force of the governor at the highest proper speed of the engine, even in wide fluctuations of the load, in order that there may never be a failure to admit a sufficient quantity of the explosive mixture to insure an explosion. It may not and preferably will not even touch the bar $R^{10}$ when the engine is under load or until its speed from release of load shall resume its allowable maximum. $R^{12}$ is an arm projecting downwardly from the loose sleeve $R^4$ in front of the bar $R^{10}$, but normally clear of said bar.

The operation of the governing device above described is as follows: In the ordinary working of the device the riding-pulley $r^2$ and its connected bar $R^{12}$ are idle, these being intended as a safety device to come into action in case the cord T, which drives the governor, shall break, as will be hereinafter pointed out. The governor-balls are thrown outward by centrifugal force due to the rotation of the pulley $R^3$, sleeve $R^2$, and collar $R^5$, by means of the cord T, and in such centrifugal action of the governor-balls the outer sleeve $R^7$ is slid outwardly on the sleeve $R^2$, with which it rotates. The spring $r^4$ opposes such outward movement of the sleeve $R^7$ in a familiar manner, and upon an increase of load on the engine, in fact, moves the sleeve $R^7$ inwardly. In the outward sliding movement of the sleeve $R^7$ (resulting from any of the familiar causes tending to this movement) the bell-crank $R^9$ is swung on its vertical pivot, with the effect of vibrating the lower end of the bar $R^{10}$ inwardly and of carrying the gage-wedge farther inward between the guide $r^{12}$ and nut $r^{13}$ and with the obvious result of correspondingly restricting the opening of the supply-valve and the quantity of the next charge to be exploded in the power-cylinder.

The spring $R^{11}$ is found to have an important steadying effect upon the governor by reason of its opposition to extreme inner movement of the bar $R^{10}$ and by the application of a tension-adjusting device to this spring the entire governor may be made to operate with the utmost steadiness and accuracy through all variations of load, while it insures the proper and timely retraction of the gage-wedge, and thereby prevents the governor from racing and the engine from skipping an explosion. Said spring should, to give the best results, be adapted to resist the inward movement of the gage-wedge with rapidly-increasing tension, and, if desired, an adjustable stud $r^{15}$ may be arranged behind the spring between its ends, as indicated in Fig. 10, to very largely increase its resistance to an exceptional impulse of the governor—such, for example, as might result from a very sudden and extreme reduction of load.

It will be observed that in the construction shown in the drawings the bell-crank arm $r^9$ is merely placed behind the vibratory bar $R^{10}$ and that the spring $R^{11}$ is in this illustrated construction relied on exclusively to retract the gage-wedge $r^{11}$. The arm $r^9$ may, if preferred, be forked to engage both sides of the upper end of the bar $R^{10}$, if desired, so that the spring $r^4$ will contribute to the retraction of the gage-wedge, but in any case the spring $R^{11}$, provided with means for adjusting its retractive force, is important in insuring proper action of the gage-wedge, and especially in preventing the racing of the governor, from which racing may result an interruption of the regularity of the explosions, which are intended in this engine to occur at every stroke, whether the engine be running with a load or light.

In case the cord or belt T' should break the weighted pulley $r^2$ falls and forces the arm $R^{12}$ against the bar $R^{10}$, with the effect of carrying the wedge $r^{11}$ so far inward as to prevent effective opening of the supply-valve, and thus of stopping the engine.

I have shown the gage-wedge as having very easy or gradual taper at the end portions of its length and an intermediate portion having a more abrupt inclination. In running the engine with a continuously heavy load (with slight variations) the thinner end of the gage-wedge will be in action, and in running continuously light (with slight fluctuations in load) the thicker end portion of said wedge will be in action; but in running with the average load, with usual fluctuations, the middle or more abruptly-inclined portion of the wedge will be in action, with the result of giving quick effect of the fluctuations upon the operations of the supply-valve.

I do not wish to be restricted to the precise details illustrated in the drawings and above described, inasmuch as my improvements may be embodied in other forms without departure from the principles of invention underlying them.

I claim as my invention—

1. In combination, with the supply-valve of a gas-engine, a movable device or gage adapted to engage the stem of the supply-valve for the purpose of limiting the opening movements of the valve, and a centrifugal governor for operating the gage device, a spring applied to the gage device and operating in opposition to the centrifugal action of the governor, said spring being adapted to act only or principally when the engine is running light and preventing the skipping of an explosion.

2. In combination, with the supply-valve of a gas-engine, a movable device or gage adapted to engage the stem of the supply-valve for the purpose of limiting the opening of the valve, and a centrifugal governor for operating the gage device, a spring applied to the gage device and operating in opposition to the centrifugal action of the governor, and means for adjusting the tension of said supplementary spring, whereby it may be made to act only or principally when the engine is running light and, in so acting, may prevent the skipping of an explosion.

3. In combination with the supply-valve of a gas-engine and a gage device, operated by a centrifugal governor, for limiting the opening movements of said supply-valve, of a weight which rides on the cord or belt by which the governor is operated, and means through which, upon the rupture of the driving-cord and the fall of said weight, the latter may exert its gravity to move the gage device into position for preventing the effective opening of the supply-valve.

4. In combination with the supply-valve of a gas-engine having an exposed valve-stem which has a nut or shoulder on its exposed portion, and a movable gage device adapted to limit the opening movements of the valve by engagement with the said shoulder, a lever, as $R^{10}$, carrying the gage device, a centrifugal governor having suitable connections for operating said lever, a spring, as $R^{11}$, arranged to exert its force upon said lever in opposition to the centrifugal action of the governor, and means for adjusting the resistance of said spring, substantially as described.

5. In combination with the supply-valve of a gas-engine having an exposed valve-stem which is provided with a nut or shoulder on its exposed portion, and with a movable gage device adapted to limit the opening movements of the valve by engagement with said shoulder, a lever, as $R^{10}$, carrying the gage device, a centrifugal governor having suitable connections for operating said lever, a spring, as $R^{11}$, arranged to exert its force upon said lever in opposition to the centrifugal action of the governor, means for adjusting the resistance of said spring, a loosely-mounted hub or sleeve $R^4$ provided with an arm $R^{12}$, and also with an arm $r'$ carrying a weight-pulley which rides on a suspended portion of the driving-belt by which the governor is operated, said arm $R^{12}$ being arranged to swing against the lever $R^{10}$ when said weight-pulley is allowed to fall.

6. In combination with the lever $R^{10}$ of a governing mechanism of a gas-engine, the spring $R^{11}$ provided with an adjusting device $r^{14}$, and the adjustable stop $r^{15}$, substantially as and for the purpose set forth.

7. In combination with the supply-valve of a gas-engine having a protruding stem provided with a nut or shoulder, a movable gage-wedge operated by a centrifugal governor and having a central, abruptly-inclined surface between less abruptly inclined surfaces at its end portions.

In testimony that I claim the foregoing as my invention I affix my signature in presence of two witnesses.

GEORGE W. LEWIS.

Witnesses:
M. E. DAYTON,
TAYLOR E. BROWN.